Figure 1:
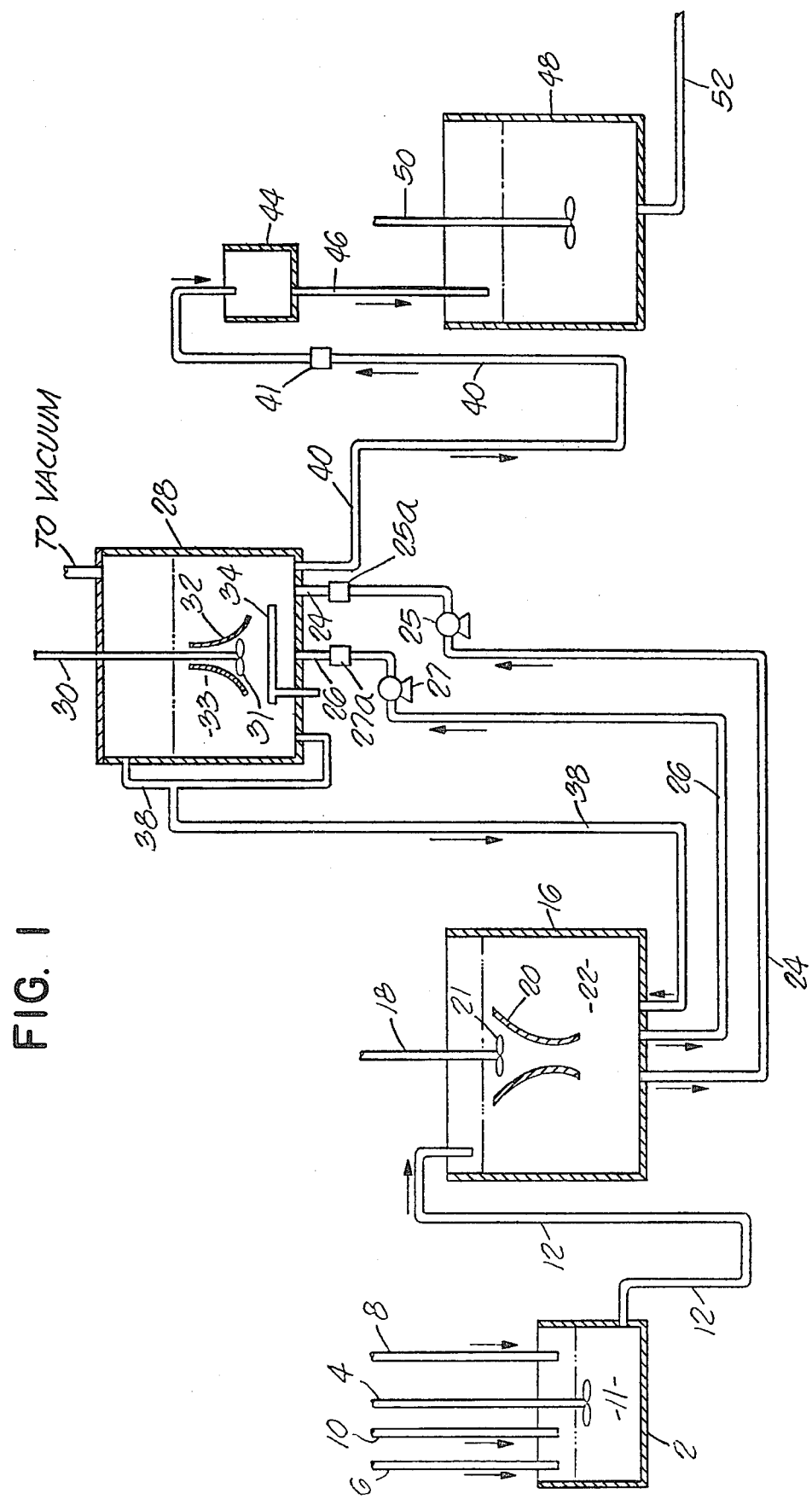

United States Patent [19]
Ore et al.

[11] 4,277,448
[45] * Jul. 7, 1981

[54] PHOSPHORIC ACID PROCESS WITH HIGH CIRCULATION RATES

[75] Inventors: Fernando Ore, Whittier; John D. Ellis, Huntington Beach; James H. Moore, La Verne, all of Calif.

[73] Assignee: Occidental Petroleum Corporation, Los Angeles, Calif.

[*] Notice: The portion of the term of this patent subsequent to Jan. 2, 1996, has been disclaimed.

[21] Appl. No.: 909,899

[22] Filed: May 26, 1978

Related U.S. Application Data

[63] Continuation-in-part of Ser. No. 865,557, Dec. 29, 1977, Pat. No. 4,196,172, and a continuation-in-part of Ser. No. 865,556, Dec. 29, 1977, and a continuation-in-part of Ser. No. 703,208, Jul. 7, 1976, Pat. No. 4,132,760, and a continuation-in-part of Ser. No. 703,138, Jul. 7, 1976, abandoned.

[51] Int. Cl.³ .................... C01F 11/46; C01B 25/22
[52] U.S. Cl. .................... 423/167; 423/319; 423/320
[58] Field of Search ............ 423/167, 319, 320, 555

[56] References Cited

U.S. PATENT DOCUMENTS

| | | | |
|---|---|---|---|
| 1,836,672 | 12/1931 | Larsson | 423/167 |
| 2,968,544 | 1/1961 | Zeitz et al. | 423/320 |
| 3,257,168 | 6/1966 | Chelminski | 423/167 |
| 3,416,889 | 12/1968 | Caldwell | 423/167 |
| 3,418,077 | 12/1968 | Robinson | 423/167 |
| 3,453,076 | 7/1969 | Long et al. | 423/167 |
| 3,522,003 | 7/1970 | Lopker | 423/167 |
| 3,522,004 | 7/1970 | Lopker | 423/167 |
| 3,690,826 | 9/1972 | Husken | 423/320 |
| 3,939,248 | 2/1976 | Caldwell | 423/167 |
| 4,059,674 | 11/1977 | Lopker | 423/167 |

FOREIGN PATENT DOCUMENTS 1959122 5/1971 Fed. Rep. of Germany ........... 423/319

Primary Examiner—Herbert T. Carter
Attorney, Agent, or Firm—Barry A. Bisson; Jeffrey G. Sheldon; Edward A. Grannen, Jr.

[57] ABSTRACT

Phosphoric acid is prepared from phosphate rock and sulfuric acid by using a reaction train comprising a dissolving slurry and a crystallization slurry maintained at different sulfate levels. Both inter and intra vessel circulation are used at high rates to minimize reagent concentration gradients and temperature gradients and provide a suitable crystallization environment. Preferably, the intra vessel circulation is substantially in plug flow, as through a draft tube.

54 Claims, 4 Drawing Figures

PHOSPHORIC ACID PROCESS WITH HIGH CIRCULATION RATES

CROSS-REFERENCES

This application is a continuation-in-part of: (a) application Ser. No. 703,138 now abandoned filed July 7, 1976, entitled "Gypsum Type Phosphoric Acid Process With Continuous Circulation Between Two Reaction Vessels"; (b) application Ser. No. 703,208 filed on July 7, 1976 now U.S. Pat. No. 4,132,760; (c) application Ser. No. 865,557 (now U.S. Pat. No. 4,196,172 issued Apr. 1, 1980) filed on Dec. 29, 1977; and (d) application Ser. No. 865,556 filed on Dec. 29, 1977. The entire disclosure of each of these four patent applications is incorporated herein by this reference, and also our application entitled "Apparatus Useful for Wet Process Phosphoric Acid Production", filed of even date herewith.

This application is related to each of the following U.S. Patent Applications:

| Serial Number | Filing Date |
| --- | --- |
| 703,139 | July 7, 1976 |
| 866,963 | January 4, 1978 |
| 866,990 | January 5, 1978 |
| 866,989 | January 5, 1978 |
| 866,988 | January 5, 1978 |
| 866,987 | January 5, 1978 |
| 867,556 | January 6, 1978 |
| 840,791 | October 11, 1977 |
| 810,484 | June 27, 1977 |
| 827,741 | August 25, 1977 |
| 840,791 | October 11, 1977 |

The entire disclosure of these patent applications is incorporated herein by this reference.

BACKGROUND

The present invention is directed to a process for the production of phosphoric acid by the wet process. Phosphoric acid has been prepared by the wet process for many years. The wet process involves the reaction of phosphatic solid materials, hereinafter termed phosphate rock, with sulfuric acid, usually in a slurry of phosphate rock and calcium sulfate in phosphoric acid. From an overall view, the sulfuric acid reacts exothermically with the phosphate rock to produce phosphoric acid and calcium sulfate; however, an intermediate exothermic reaction is that of phosphate rock with phosphoric acid to produce monocalcium phosphates. Furthermore, the preparation of calcium sulfate hemihydrate or dihydrate is slightly endothermic.

The names of the three processes are based upon the by-product calcium sulfate produced; namely, the gypsum or dihydrate process, the hemihydrate process and the anhydrite process. The type of by-product produced is dependent upon the temperature of the system and the $P_2O_5$ concentration of the liquid. Other factors such as fluorine concentration, alumina concentration and sulfate in concentration play a less important role.

As used herein, "calcium sulfate" refers to all three types of calcium sulfate, i.e. gypsum, hemihydrate, and anhydrite.

Gypsum, $CaSO_4.2H_2O$, is the by-product formed when the wet process is run at a temperature of 90° C. or less and a $P_2O_5$ concentration of about 30% in the liquid portion of the slurry. Increasing the temperature to about 90°–120° C. and the $P_2O_5$ concentration to about 40% in the liquids phase yields hemihydrate, $CaSO_4.\frac{1}{2}H_2O$. Adjusting the temperatures and concentrations, for instance, to 75° C. and 40% $P_2O_5$ results in a mixture of gypsum and hemihydrate which is very unstable. An unstable system such as this causes trouble during filtration due to the hardening or setting-up of the gypsum-hemihydrate solid on the filter. Care must be exercised in maintaining the proper temperature and $P_2O_5$ concentration in the process being run in order to avoid such problems. $CaSO_4$, anhydrite, is produced at temperatures of about 130° C. at $P_2O_5$ concentrations greater than 30%. This latter process is most difficult to run due to the severe corrosion at the higher temperatures and the instability of the anhydrite during processing.

Because the overall reaction between sulfuric acid and phosphate rock is exothermic, provisions can be made to remove heat from the system at a preselected temperature of the reaction system. This has been accomplished by (1) blowing air through the slurry or (2) pumping a portion of the slurry to a vessel under vacuum or (3) conducting the operation in a vessel under vacuum. The first method, use of air as a coolant, is undesireable because it is necessary to scrub large amounts of air exiting the system to remove pollutants, mainly fluorine in the form of hydrogen fluoride or silicon tetrafluoride. The equipment required for scrubbing is quite expensive.

In the second method, described in U.S. Pat. No. 2,699,985, a portion of the hot slurry is removed from the main body of the slurry, and subjected to vacuum. Cooling occurs by evaporation of water. The cooled slurry is recycled to the main body of the hot slurry and moderates the temperature of the process.

A third method, conducting the reaction under vacuum, has many desirable features. For example, the cooled slurry is immediately dispersed within the hot slurry and temperature differentials within the slurry are minimized. In addition, the slurry is concentrated by the removal of water, and the desired temperature is easily maintained.

Problems associated with the calcium sulfate dihydrate (gypsum) process include the incomplete reaction of phosphate rock, poor filterability and washability of the by-product calcium sulfate, and coprecipitation of calcium phosphate with the calcium sulfate. Such problems can occur when employing the hemihydrate process.

For example, incomplete reaction of phosphate rock can result from precipitation of calcium sulfate dihydrate on the surface of the phosphate rock. This deposit impedes digestion of the rock with sulfuric acid or phosphoric acid, resulting in the undissolved rock which is passed to waste disposal. This deposit is caused by an excessively high local concentration of sulfate ions in the presence of the phosphate rock.

Filtration of the slurry produced in the gypsum process can be slow. If and when, due to reaction of phosphate rock with phosphoric acid, increased cooncentrations of calcium phosphates and sulfuric acid occur in proximity to each other, many small crystals form as product solids. A situation arises in which a high number of small particles are formed in the system. Increasing the residence time does little to improve particle size. The rate of filtration of the slurry containing these small crystals (or "fines") is drastically reduced.

Coprecipitation of dicalcium phosphate ($CaHPO_4$) with calcium sulfate dihydrate can occur in the presence of localized high concentrations of monocalcium phosphate $Ca(H_2PO_4)_2$. This results in loss of phosphate values because the calcium becomes part of the calcium sulfate dihydrate crystal structure. As such, it cannot be washed out of the crystal structure during subsequent separation and washing operations and it passes to waste disposal.

Attempts to alleviate the problem of poor dispersion or localized high concentrations of reactants are many. In use today are the one slurry system and the multi-slurry system for the production of phosphoric acid by the wet process. Circulation within each vessel and circulation between vessels is desirable.

In one slurry process, the phosphate rock and the sulfuric acid are added to the slurry in one tank. Agitators, in union with baffles are used to circulate the slurry into which the reactants (phosphate rock and sulfuric acid) are added. To the extent that the localized concentration differences are minimized the slurry has only one sulfate level. This is undesirable because improved yields are obtained when the phosphate rock is dissolved at a lower sulfate concentration than at which calcium sulfate crystallizes.

A multi-slurry system can be of two types. Two or more compartments or cells can be constructed within one large vessel, the compartments being interconnected in series, or multi-vessels can be used. For the multi-compartment scheme, the reactants are added separately, that is, in different compartments in order to increase the dispersion of the reactants in the slurry. At the last compartment, some slurry is removed from the system for recovery of phosphoric acid. The major portion of the slurry is recycled from the last compartment to the first compartment.

A multi-vessel process involves the use of two or more connected vessels. The reactants are added to the slurry in separate vessels so as to more completely disperse one reactant in the slurry before it is contacted by later added reactants. Often the system is arranged so that slurry is recycled from the last vessel back to the first.

There is a need for a method and apparatus for producing phosphoric acid by the wet process where the problems of incomplete reaction of phosphate rock, poor filterability and washability of the by-product calcium sulfate, and coprecipitation of calcium phosphate with by-product calcium sulfate, are avoided.

SUMMARY

The present invention is directed to a process, and apparatus for practicing the process, with the above features. This process involves adding phosphoric acid and phosphate rock to a dissolving slurry in a dissolving zone. The dissolving slurry comprises calcium sulfate, monocalcium phosphate, and phosphate rock. The added phosphate rock is substantially converted into monocalcium phosphate, phosphoric acid, and calcium sulfate. To produce calcium sulfate dihydrate, the soluble sulfate concentration in the dissolving slurry is preferably maintained from about $-1$ to about $+1$.

A first portion of this dissolving slurry is continuously introduced into a crystallization slurry in a crystallization zone. The crystallization slurry comprises calcium sulfate, monocalcium phosphate, phosphoric acid, and sulfuric acid, and is maintained under vacuum. Sulfuric acid is added to the crystallization slurry to react with the moncalcium phosphate and the phosphate rock to form calcium sulfate and phosphoric acid.

The soluble sulfate concentration of the crystallization slurry is maintained at least about 0.5% (e.g. 0.5 to 1.5%) greater than the soluble sulfate concentration of the dissolving slurry. To produce calcium sulfate dihydrate, the soluble sulfate concentration in the crystallization slurry is preferably maintained from about $+1\%$ to about $+3\%$.

Both inter and intra slurry circulation are used at high rates to minimize reagent concentration gradients and temperature gradients in the slurries, thereby resulting in high recovery of phosphate values. For this purpose, a first portion of the crystallization slurry is continuously introduced directly into dissolving slurry. In addition, a second portion of the dissolving slurry and a second portion of the crystallization slurry are internally circulated at a rate at least equal to 50% of the volume of the respective slurry per minute.

To recover product, a third portion of the crystallization slurry is withdrawn from the crystallization zone and separated into a liquid comprising phosphoric acid and a solid comprising calcium sulfate.

In one version of the invention, the dissolving zone comprises only one vessel which contains the dissolving slurry. In this version, the first portion of the dissolving slurry is continuously introduced directly into the crystallization slurry.

In another version, the dissolving zone comprises more than one vessel, e.g., a first vessel and a second vessel serially connected. The phosphoric acid, phosphate rock, and the first portion of the crystallization slurry are introduced substantially only to the first vessel. Slurry passes from the first vessel to the second vessel, and dissolving slurry is introduced to the crystallization slurry substantially only from the second vessel. Preferably there is also a substantial recycle from the second vessel back to the first vessel in order to minimize sulfate ion concentration difference between the two vessels.

Apparatus for practicing this process includes a first vessel or set of vessels containing the dissolving slurry and a second vessel or set of vessels containing the crystallizing slurry, and includes means for maintaining the second or crystallizing system (or set of vessels) under vacuum. Means are provided for adding phosphoric acid and phosphate rock to the dissolver system. Means are also provided for continuously passing a first portion of the dissolving slurry from the dissolver system into the crystallizer system. Means are also provided for adding sulfuric acid to the crystallizing system. There are means for continuously passing a first portion of the crystallizer slurry from the crystallizer system into the dissolver system. There are also means for internally circulating a second portion of the dissolver slurry and a second portion of the crystallizer slurry in their respective reaction vessels at a rate at least equal to 50% of the volume of the respective slurry per minute in each vessel. The apparatus also includes means for withdrawing a third or product portion of the crystallizer slurry from the crystallizer system and means for separating the withdrawn product portion into a liquid comprising phosphoric acid and a solid comprising calcium sulfate.

DRAWINGS

Figure 2:
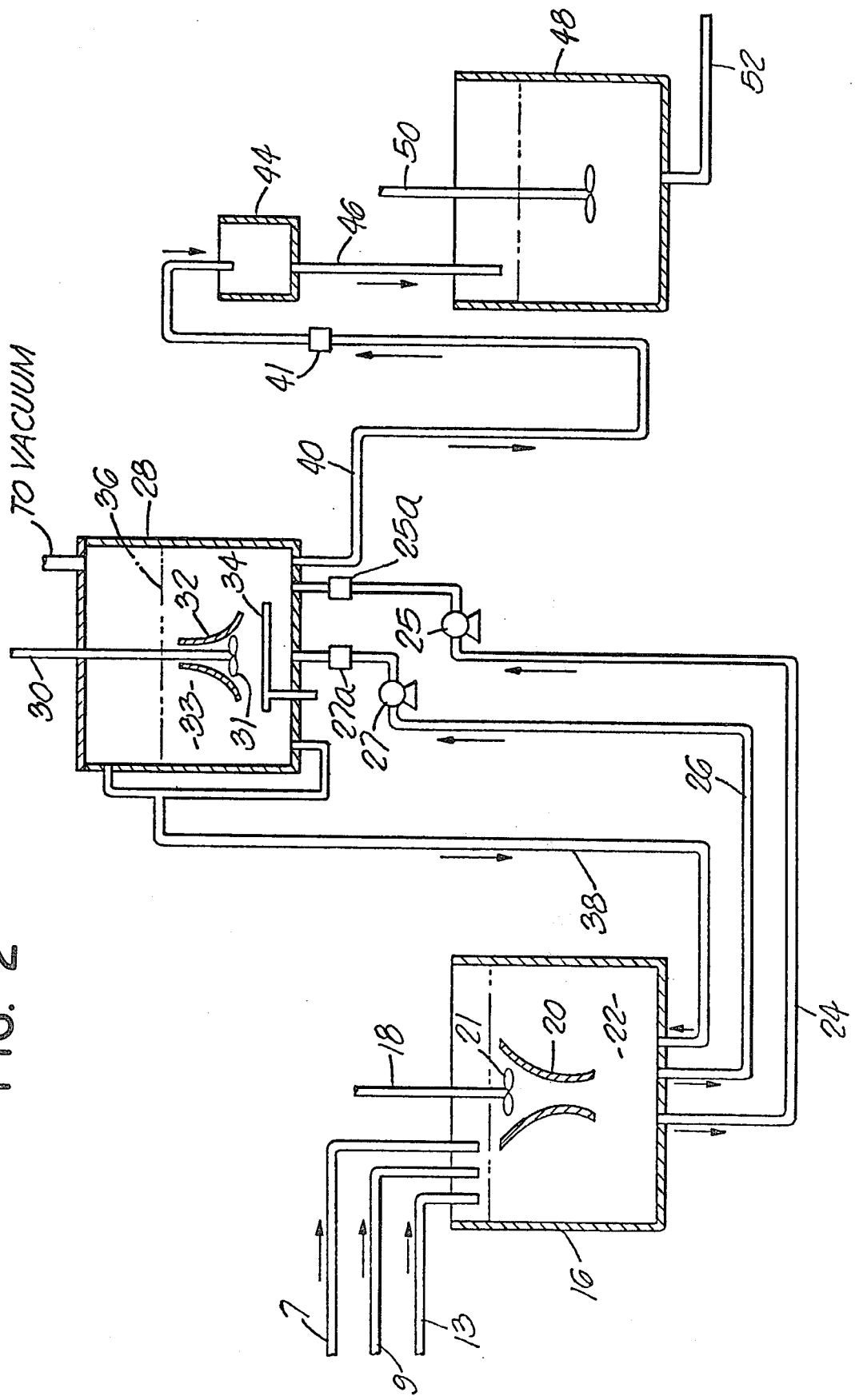
Figure 3:
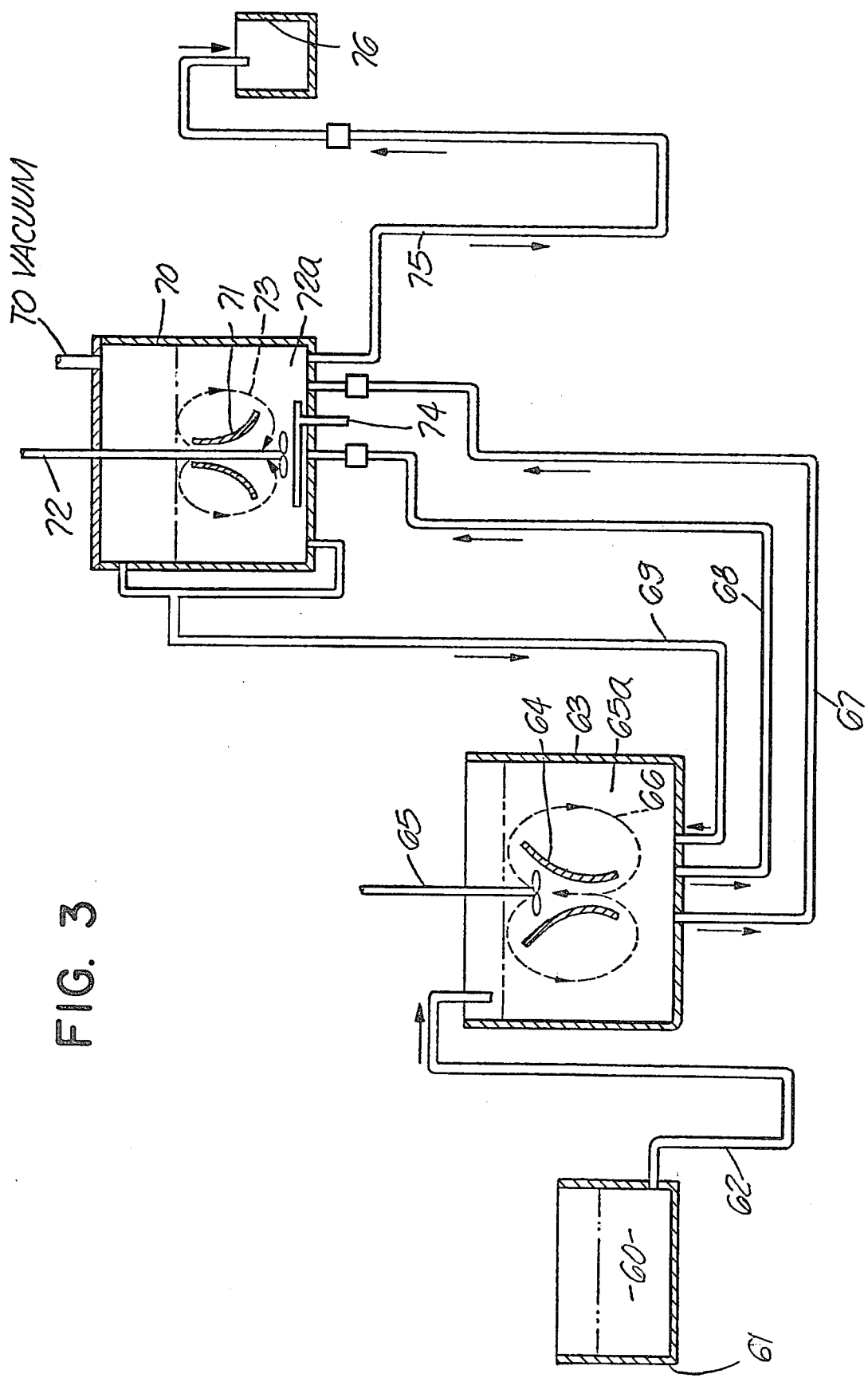
Figure 4:
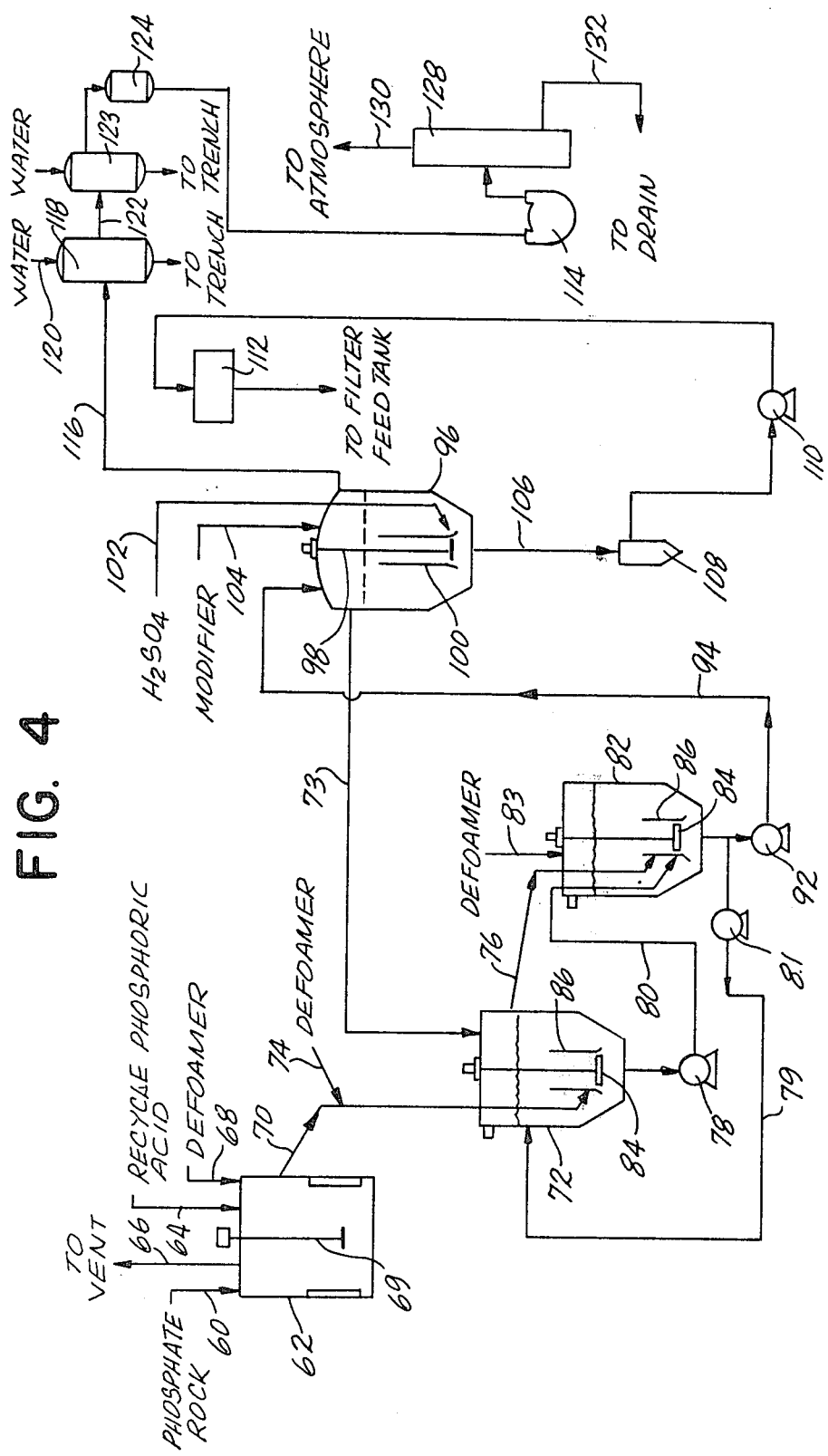

These and other features aspects and advantages of the present invention will be better understood with reference to the appended claims, following description, and accompanying drawings where;

FIG. 1 schematically shows one version of the process of the present invention;

FIG. 2 shows another version of the process of the present invention;

FIG. 3 schematically shows inter- and intra-vessel flow patterns in accordance with the present invention; and FIG. 4 schematically shows another version of the process of the present invention.

DESCRIPTION

This invention is directed to a process for the production of phosphoric acid by the wet process. Although the process steps and equipment described herein can be used for the anhydrite or the hemihydrate process, the process will be described in terms of the calcium sulfate dihydrate (gypsum) process.

Phosphate rock, either calcined or uncalcined, and phosphoric acid are added to a first slurry comprising phosphate rock, calcium sulfate dihydrate, monocalcium phosphate, phosphoric acid and sulfuric acid. Preferably, the phosphate rock is combined with the phosphoric acid prior to the addition to the first slurry. Phosphate rock, about 95% +100 mesh, containing at least 30% $P_2O_5$ is a preferred source of phosphate for the process. For dihydrate ground is preferred but unground rock can be used. For example, phosphate rock of 95% −200 mesh or 98% −10 mesh can be used. Rock containing less than 30% $P_2O_5$ is acceptable, and can be employed in this process. High alumina phosphate pebble may also be used, (but more preferred in a hemihydrate process, because of low aluminum in the product acid), especially when the resulting acid is purified by the process of U.S. Application Ser. No. 676,559 filed Apr. 13, 1976 by Ore, the entire disclosure of which is hereby incorporated herein. Analysis of typical phosphate rock is presented in Table 1.

In the dihydrate process the phosphate rock is mixed with phosphoric acid that contains up to about 30% $P_2O_5$ (preferably less than 20%). Phosphoric acid, recycled from the filter or separation section, containing from about 10% to about 20% $P_2O_5$, and usually some sulfuric acid, preferably is used in the process. When the phosphoric acid is recycled from the separation section it typically can contain from about 0.5% to about 3.5% sulfuric acid by weight. Phosphoric acid from other sources, such as other phosphate plants, and/or merchant grade phosphoric acid can be used in place of or to supplement the recycled acid.

The temperature of the phosphate rock-phosphoric acid mixture can be maintained at about ambient to about 90° C., preferably from about 65° C. to about 90° C. The resulting slurry contains from about 30% to about 45% solids by weight, about 38% being preferred. Calcination of the rock can reduce or eliminate foaming.

In a two vessel, dissolver-crystallizer, mode the phosphate rock-phosphoric acid mixture is added to a first slurry, refered to herein as a dissolving slurry, comprising calcium sulfate dihydrate, phosphoric acid, monocalcium phosphate and sulfuric acid in a first reaction vessel in a dissolving zone. The phosphate rock and phosphoric acid can be admixed in a separate vessel, as described above and shown in FIGS. 1 and 4, or can be added separately to the first slurry in the first reaction vessel as shown in FIG. 2. The dissolved monocalcium phosphate is preferably at less than saturation, to minimize localized super saturation, which favors formation of fines. The dissolving zone can contain more than one vessel as shown in FIG. 4. The phosphate rock-phosphoric acid mixture on being added to the first slurry in the first reaction vessel is rapidly dispersed within the first slurry. A portion of the first slurry is transferred to a second reaction vessel, described below.

The first reaction vessel is fitted with a draft tube and an agitator, although the draft tube can, in some cases, be removed. The agitator can consist of a shaft fitted with a propeller at its bottom. The agitator is so located with respect to the draft tube that on activation of the agitator, a second portion of the first slurry is drawn from the bottom of the draft tube up through the draft tube and out the top of the draft tube. On exiting the draft tube the dissolving slurry passes in a downward direction in the annular space between the draft tube and the walls of the first reaction vessel. The direction of circulation through the draft can be reversed and is not critical. In this first vessel, considerable gas ($CO_2$) is generated and, like a giant milkshake, the apparent density of the contents can be about 1.0 g/cc, although when the gas is removed, the actual density of the contents is about 1.46 to about 1.65 g/cc, and preferably from 1.55 to about 1.63 g/cc. The density of the liquid portion of the slurry is from about 1.20 (about 17% $P_2O_5$) to about 1.38 g/cc, (about 30% $P_2O_5$), preferably from about 1.25 (about 21% $P_2O_5$) to about 1.35 g/cc (about 28% $P_2O_5$).

The purpose of the draft tube is to create substantial plug flow circulation within the first vessel. In addition to the use of the draft tube, plug flow can also be created by other means such as pumping a recycle around an external loop or injection of fluid at the bottom of the vessel through a vertical venturi nozzel-throat arrangement.

Circulation is thus established within the first reaction vessel. The rate at which the first slurry is circulated is at least equal to about 50% of the volume of the slurry in the first reaction vessel per minute to obtain adequate mixing of the reagents. Preferably the rate at which the first slurry is circulated is less than about 150% of the volume of the slurry in the first reaction vessel to avoid excessive wear on the agitator and because circulation at rates much greater than 150% results in only marginal improvement in performance. Therefore, preferably the first slurry is circulated at a rate of from about 50% to about 150% of the volume of the first slurry in the first reaction vessel, and more preferably at a rate of about 100% of the volume of the first slurry in the first reaction vessel.

This circulation thoroughly disperses the phosphate rock-phosphoric acid mixture within the first slurry. The recycled phosphoric acid dissolves at least a portion of the $P_2O_5$ in the rock, thereby forming monocalcium phosphate. This is an exothermic reaction which supplies the heat required to maintain the temperature of the slurry in the first reaction vessel between about 70° C. to about 90° C., and preferably from about 80° C. to about 88° C. Residence time of the phosphate values in the first reaction vessel is from about 2.0 hours to about 5.0 hours, preferably from 3.75 hours to about 4.25 hours. The soluble or "excess" sulfate content of the first slurry is maintained at from about −2.0% to about +1.5%. As the sulfate values in the first slurry increase above about +1.5%, there is danger of coating the phosphate rock with calcium sulfate dihydrate and hence losing phosphate values to waste.

A defoamer is added to the phosphate rock-phosphoric acid mixture, the first slurry, or both, if and when required. The defoamer can be selected from the group consisting of tall oil rosin, alkoxylated tall oil rosin (see U.S. Pat. No. 3,594,123, issued July 20, 1971 to Encka et al), tall oil fatty acids, whole or part esters of tall oil fatty acids, oleic acid, sulfated oleic acid, silicones and mixtures of monocarboxylic acid (12-22 carbon atoms) and monoalkanoylamide derivatives of the monocarboxylic acid. The perferred defoamer comprises a mixture of methyl esters of tall oil fatty acid and tall oil fatty acids sold by AZ Products Co. of Eaton Park, Florida under the tradename "AZ 10 A" (which also contains small amounts of alkyl sulfonate). The amount of the defoamer used is preferably from about 0.01% to about 0.3%, typically 0.04 to 0.1% by weight, based on the weight of the slurry transferred to the separation section, or about 0.05% to 1.5% based on $P_2O_5$ produced by the process. Venting of the reslurry and/or dissolver vessels can reduce defoamer usage. AZ 10A is a propietary product. Infra-red spectroscopy and hydrolysis data show that it comprises a mixture of carboxylic acids and esters.

The temperature and $P_2O_5$ content in the dissolver vessel, and in the crystallizer or second vessel which is described below, are within a region which produces calcium sulfate dihydrate as a by-product.

As measured, soluble sulfate values can be either positive or negative. Soluble sulfate values include not only the sulfuric acid present in the liquid component of the slurry but also the soluble calcium sulfate present. Negative soluble sulfate values indicate that excess of calcium ions are present in the solution, as is usually observed in the phosphate rock-phosphoric acid mixture. Positive soluble sulfate values indicate that excess sulfate ions are present. A value of 0.0% indicates that the sulfate ions and the calcium ions are equivalent stoichiometrically within the limits of the analysis.

One typical analysis is 0.9% CaO and 2.2% $SO_4$ which calculates $$\frac{0.9}{1} \left| \frac{96}{56} \right| \frac{(M.W.\ SO_4)}{(M.W.\ CaO)} = 1.5\%$$

This leaves $2.2-1.5 = +0.7\%$ "free or soluble" sulfate, i.e. a positive soluble sulfate.

Another analysis is 0.98% CaO and 1.4% $SO_4$, which calculates $$\frac{0.98}{1} \left| \frac{96}{56} \right.$$

= 1.7 sulfate equivalents, which when subtracted from the CaO, 1.4, $= -0.3\%$ soluble sulfate, i.e. there is insufficient sulfate concentration to combine with all of the calcium, which is reported as a negative value.

The numerical value of negative sulfate can vary somewhat depending on the analytical procedure for sulfate ions. For positive sufate values, there is little or no difference between values obtained by different analytical methods. The preferred method of calcium analysis is by atomic absorption, which is highly accurate for both positive and negative sulfate.

In applying the present invention to a hemihydrate process, the most important factor in the preferred operation is that a negative sulfate be maintained in the first (dissolver) vessel. Even a slight positive sulfate (e.g. $+0.7\%$) in the dissolver can cause decreases in yield of phosphoric acid produced by the process (one cause being due to greatly increased nucleation, another at about 1.5% $SO_4$ to coating of the phosphate rock which decreases the amount dissolved).

A first portion of the first slurry is transferred through a first conduit to a second slurry, also referred to as a crystallization slurry, contained in a second reaction vessel. The second reaction vessel, which preferably is subjected to a vacuum, is fitted with a draft tube, an agitator and a sulfuric acid inlet. The agitator consists of a shaft fitted with a propeller at its bottom. The shaft and agitator agitator are so located with respect to the draft tube that on actuation of the agitator a portion of the second slurry flows from the bottom of the draft tube up through the draft tube and out the top of the draft tube. On exiting the draft tube, the slurry flows downwardly in the annular space between the draft tube and the inside walls of the second reaction vessel. The direction of the circulation can be reversed and is not critical. The rate at which the slurry is circulated is at least equal to about 50% of the volume of the slurry in the vessel per minute, preferably from about 50% to about 150% of the volume and most preferably about 100% of the volume. These specific circulation rates are preferred for the same reasons they are preferred for the dissolving slurry, as described above. Means other than a draft tube with agitator, such as venturis or introduction of fluid at the bottom of the second vessel can be used to obtain plug flow in the second vessel.

Sulfuric acid is added through a sulfuric acid inlet into the second slurry. The sulfuric acid can be added by itself or mixed with phosphoric acid.

The terms "dissolving" slurry and "crystallization" slurry are used herein to indicate the primary function of these two slurries. The dissolving slurry functions primarily to dissolve phosphate rock, although crystallization of calcium sulfate can and does occur in the dissolving slurry. Likewise, the crystallization slurry functions primarily to crystallize calcium sulfate, although some dissolving of phosphate rock can and does occur in the crystallization slurry.

A crystal modifier, usually a derivative of tall oil or of an organic sulfonic acid, preferably a salt, can be added to the slurry in the second reaction vessel. The crystal modifier can also be added to the first reaction vessel. A perferred crystal modifier is selected from alkyl, aryl, alkylaryl, and alicyclic derivates of sulfonic and sulfuric acids in which the organic radical contains from about 12 to about 30 carbon atoms. The free acid, salts thereof and mixtures of the free acids and salts can be used. The preferred salts include those of alkali metals, ammonia and alkyl, aryl or alkylaryl amines (e.g. trimethyl amine, diethyl amine, monopropyl amine). Polymeric sulfonates and sulfates can also be employed. Examples of crystal modifiers which can be employed in the present process are alkyl sulfonic acids containing from about 12 to about 30 carbon atoms, benzenesulfonic acid, alkylbenzenesulfonic acid in which the alkyl group contains from about 8 to 20 carbon atoms, alkylcyclohexane sulfonic acid in which the alkyl group contains from about 8 to about 20 carbon atoms, polymeric sulfonates and sulfates such as polystyrene sulfonate, and polyvinylsulfonate, the polymeric material having a molecular weight of from about 500 to about 1,000,000. The organic sulfonic acid can be an alkyl-, aryl-, or an alkylaryl-sulfonic acid, or a sulfated derivative of a carboxylic acid or an alkali metal, amine or ammonium salt thereof.

For example, tetradecylsulfonic acid, benzene-sulfonic acid, isooctylbenzene sulfonic acid and sulfated oleic acid can be used as crystal modifiers in this process. Mixtures of two or more modifiers are also useful. The crystal modifier is added for the purpose of improving the filtration rate of the dihydrate crystals formed in the system (probably by decreasing the amount of fines). The preferred salts include those of sodium, potassium, ammonia and primary, secondary and tertiary alkyl amines containing from 1 to about 30 carbon atoms. Preferably, the modifier as described above, is present at a level of about 1 to 1000 ppm, usually 5 to 500 ppm, based on the weight of slurry to a separation operation, described below. Preferably, the levels of modifier and of defoamer, if any, are kept as low as possible, while maintaining good filterability, since residual quantities in the phosphoric acid product can cause crud formation (e.g., emulsions and deposits) if the acid is later treated to remove magnesium impurities by the process of U.S. Patent Application Ser. No. 688,265 filed May 20, 1976 which is incorporated herein and the related processes in U.S. Patent Application Ser. 840,791 filed October 11 1977. An unexpected discovery is that salts of sulfonic acids can be used as crystal modifiers in the process of the present invention without causing an adverse increase in solution viscosity.

A preferred crystal modifier, especially when AZ 10A is also present, is Actrasol W-40. Actrasol W-40 is a mixture of predominantly saturated sodium alkyl sulfonates. The alkyl groups are in the 12 carbon range, although there is a distribution from about 9-15 carbons. There are approximately 16 different sulfonates in the mixture, many of which are isomers and homologs of each other. It appears that Actrasol W-40 is made by the sulfonation of propylene tetramer, butylene trimer, or other material consisting of a mixture of isomers and homologs.

The flow of the second slurry within the second reaction vessel thoroughly disperses within the second slurry the sulfuric acid, the crystal modifier, and the portion of the first slurry introduced into the second slurry. The location of the sulfuric acid inlet in the second reaction vessel is not critical. It can be at the top, the middle, the bottom or at intermediate positions in the second reaction vessel. The sulfuric acid conduit attached to the sulfuric acid inlet can enter the second reaction vessel from the top, the bottom, or points intermediate therein; the exact point of entrance into the vessel is not critical. The flow of the second slurry within the second reaction vessel thoroughly disperses the first slurry and the sulfuric acid within the second slurry.

The surface of the second slurry in the second reaction vessel is preferably exposed to a pressure of between about 2 to about 28 inches of mercury absolute, more preferably from about 3 to about 20 inches mercury absolute. Water and volatile components added to, or produced in, both the first and second slurries can be removed from the second slurry by evaporation. The cooled second slurry is thoroughly mixed so that temperature differentials are minimized within the total volume of the second slurry. With this evaporative cooling, the temperature of the second slurry is maintained preferably from about 70° C. to about 90° C. (in the hemihydrate mode, up to about 115° C.). Although it is greatly preferrable to operate the second vessel under reduced pressure, the process can be run while maintaining both the first and second reaction vessels at atmospheric pressure. Sulfuric acid, which is added to the second slurry in the second reaction vessel through the sulfuric acid inlet, can be from about 50% to 99% $H_2SO_4$, and preferably is about 93% $H_2SO_4$ (compared to 98% in the hemihydrate mode).

The total sulfate values added to the system is the sum of the sulfate values in sulfuric acid added plus the sulfate values added in the rock. The soluble sulfate content as measured in the second slurry is from about +0.5 to about +3.0, preferably from about 1.5% to about 2.5%. The soluble sulfate content in the second slurry is always greater than the soluble sulfate content in the first slurry, and preferably is at least about +0.05% greater. The specific gravity of the slurry in the second reaction vessel is from about 1.46 to about 1.65 g/cc. The density of the liquid portion of the slurry is from about 1.20 g/cc (about 17% $P_2O_5$) to about 1.38 g/cc (about 30% $P_2O_5$). The residence time of the solids in the second reaction vessel is from about 0.6 hour to about 2.0 hours, preferably from about 0.7 hour to about 1.6 hours.

A first portion of the second slurry flows from the second reaction vessel back to the first reaction vessel through a second conduit and is thoroughly dispersed within the first slurry. The flow of the second slurry to the first slurry aids in controlling the temperature of the first slurry and adds sulfate values (sulfuric acid) and phosphoric acid values to the first slurry in order to dissolve the rock. Additional sulfate values are added to the first slurry in the first reaction vessel with the recycled phosphoric acid which can contain from about 0.5% to about 3.5% sulfuric acid by weight. Circulation between vessels and within vessel minimizes localized concentration of reactants and avoids hot spots, thus resulting in an easily controlled process.

A third portion of the second slurry is removed from the crystallizing zone, i.e., the second reaction vessel and is transferred through a conduit to a reservoir. The third portion of the second slurry, on a weight basis, is approximately equal to the phosphate rock, the phosphoric acid, and the sulfuric acid added to the first and second reaction vessels minus the volatiles, on a weight basis, removed from the second reaction vessel. The third portion of the second slurry is pumped to a third vessel. The third portion of the second slurry is constantly stirred in the third vessel to prevent separation of the solids from the liquids and it is maintained at about 50° C. to about 90° C., preferably about 70° C. to about 85° C. The residence time in the third vessel is relatively short, being from about 0.5 hour to about 1.5 hours; preferably from about 0.75 hour to about 1.25 hours. The soluble sulfate concentration of the slurry in the third vessel can change somewhat due to continued reaction of the soluble sulfate values with any calcium values present. Sulfuric acid can be added to the third vessel to maintain the soluble sulfate concentration at a desired level.

From the third vessel the slurry is transferred to a separation zone in which the slurry is separated into its solid and liquid components such as by filters. The solid component comprises calcium sulfate dihydrate and the liquid component comprises phosphoric acid and sulfuric acid.

The high internal circulation rates required for mixing can also be expressed in terms of the ratio of internal circulation versus the rate at which a third portion of the crystallization slurry is withdrawn to separation. For example, preferably the internal circulation rate of the crystallization slurry is at least about forty times the rate at which the third portion of the crystallization slurry is withdrawn from the crystallization zone to separation. Also, preferably, with a single dissolver vessel the dissolving slurry is internally circulated at a rate at least equal to about one hundred times the rate at which the third portion of the crystallization slurry is withdrawn from the crystallization zone to separation. With two dissolver vessels, the rate in each would be about 50.

For plant control purposes, the flow rates of the reactants and of the slurries can be adjusted in accordance with the analytical values obtained in order to maintain the desired sulfate levels within the reaction system. It is to be understood that the system described can be run on a batch or continuous basis. With a continuous system, the reactants can be continuously added and the third portion of the second slurry can be continuously removed from the system prior to the separation into phosphoric acid and calcium sulfate dihydrate.

Yield and filtration rate can be improved by substantial completion of rock dissolution before significant crystallization occurs, such as by using 2 dissolver reactors in series, as shown in FIG. 4.

FIG. 1 shows a schematic of a version of this process. Phosphoric acid at about 70° C. is added through a conduit 6 and phosphate rock is added through a conduit 8 into a mixing vessel 2 containing an acid/rock mixture 11. The acid and rock are mixed and react to form at least some monocalcium phosphate in the mixing vessel 2 which is fitted with an agitator 4. Defoamer is added through a conduit 10 as needed. In a preferred embodiment, conduit 10 is of much greater height and/or diameter than is required solely for introduction of the defoamer and, thus, can function as a vent. Properly chosen venting can greatly reduce foaming and, in many cases, can eliminate the need for a defoamer in the mixing vessel 2. The temperature of the mixture 11 is about 70° C. and the solid content is about 30% to about 40% by weight. A portion of the mixture 11 is transferred through a conduit 12 to a first reaction vessel 16. A portion of a crystallization slurry 33 is transferred from a second reaction vessel 28 to the first reaction vessel 16 through a conduit 38. The first vessel 16 is fitted with an agitator comprising a shaft 18 and propeller 21 attached to bottom thereof, and a draft tube 20. The mixture from conduit 12 and the slurry from conduit 38 flow into a dissolving slurry 22 which is composed of calcium sulfate dihydrate, monocalcium phosphate, phosphoric acid and sulfuric acid, whereby calcium sulfate dihydrate, phosphoric acid and additional monocalcium phosphate are formed by reaction of the phosphate rock with phosphoric acid and sulfuric acid. The propeller 21 of the agitator is so positioned with respect to the location of the draft tube 20 so that an actuation of the shaft 18 and propeller 21, by a motor (not shown), the dissolving slurry 22 in the first reaction vessel 16 flows from the bottom portion of the draft tube 20 up through the inside of the draft tube 20. On exiting the top of the draft tube, the slurry 22 flows downwardly in the annual space between the draft tube 20 and the inside walls of vessel 16. The direction of flow of the slurry can be reversed. By this internal circulation, thorough mixing of the streams introduced to the first vessel is achieved. The dissolving slurry 22 is at a temperature of about 80° to about 90° C., has a soluble sulfate content of about $-2.0\%$ to about $+1.5\%$ and has a density of about 1.46 to about 1.65 g/cc. Dissolving slurry 22 is then transferred to the second vessel 28 through conduits 24 and/or 26 using pumps 25 and/or 27. The second vessel 28 can be vertically offset from the first vessel 16 or it can be at the same elevation as the first vessel 16. Samples for analysis of the dissolving slurry can be removed from sample ports 25a and/or 27a on the outlet side of pumps 25 and 27, respectively.

Build-up of settled solids can occur in portions of the bottom of the dissolver when the plant shuts down temporarily. To prevent much build-up, pipes can be added through which air can be pumped to the bottom of the reactor. This is the invention of Al Adams, and is the subject of a separate application.

The second reaction vessel 28 is equipped with an agitator comprising a shaft 30 and a propeller 31 attached to the bottom thereof, a draft tube 32 and a sulfuric acid inlet 34. On entering the second vessel, the slurry 22 is intimately dispersed into the crystallization slurry 33. Sulfuric acid is added from the sulfuric acid inlet 34 and is also thoroughly dispersed into the crystallization slurry 33. The sulfuric acid inlet can be attached to the sulfuric acid source (not shown) by a conduit; the conduit can enter the bottom of the second reaction vessel as shown in FIG. 1, or it can enter the second vessel 28 from the top or any position between the top and the bottom. Constituents of the dissolving slurry 22 react with constituents of the crystallization slurry 33 to form phosphoric acid and calcium sulfate dihydrate, the soluble sulfate concentration of the crystallization slurry being between about $+0.5\%$ to $3.0\%$. Activation of the agitator of the second vessel causes a flow of slurry 33 from the bottom of the draft tube 32 up through the draft tube 32 and out the top portion of the draft tube. On exiting the top of the draft tube 32, slurry flows downwardly in the annular space between the draft tube 32 and the inside walls of the second vessel 28. The crystallization slurry 33 can flow in either direction through the draft tube 32. Circulation established within the second vessel 28 disperses dissolving slurry 22 and sulfuric acid into the crystallization slurry 33.

The second vessel 28 is subjected to a vacuum of about 5 inches of mercury absolute to about 28 inches of mercury absolute. Water is evaporated from the surface 36 of the hot crystallization slurry, thus cooling the slurry. In addition to water, other volatile materials produced by the reaction of sulfuric acid with phosphate rock such as HF, $H_2S$, $SiF_4$, etc. are also removed. Because of the internal circulation of the crystallization slurry within the second vessel 28, temperature gradients are minimized. As noted above, crystallization slurry 33 at a temperature of about 65° C. to about 90° C. and a sulfate content of about $+1.0\%$ is about $+3.0\%$ is recirculated back to the first vessel 16 through the conduit 38. The crystallization slurry 33 is efficiently, rapidly, and effectively dispersed within the dissolving slurry 22 in the first vessel 16. Thus a system has been developed in which both inter- and intra-vessel circulation occur so as to better disperse the reactants being added to the slurries and to reduce temperature gradients within the vessels.

A portion of the crystallization slurry 33, about equal to the amount of reactants added (phosphoric acid, phosphate rock and sulfuric acid), minus the amount of water and volatiles removed from the system under vacuum, is removed from the second vessel 28 via conduit 40. Samples for analysis of the second slurry can be removed via a sample port 41 located on the conduit 40. The slurry is pumped (pump not shown) to a reservoir 44 from which it flows by gravity to a third vessel 48 through a conduit 46. An agitator 50 maintains the slurry in a dispersed condition in the third vessel. The slurry is pumped (pump not shown) from the third vessel 48 through a conduit 52 to a separation section (not shown).

Reactants are continuously added to the first vessel 16 and to the second vessel 28 with water and volatiles constantly removed from the second vessel 28 and the product slurry is constantly withdrawn from the second vessel 28. In case of separation apparatus breakdown, the system can be placed on recycle. In the recycle mode, no reactants are added to the system. Intra-vessel circulation continues and inter-vessel circulation is discontinued. The appropriate valves (not shown) are closed and the conduits drained.

A less preferred version of a process employing features of the claimed invention is shown in FIG. 2. Instead of adding the phosphoric acid, phosphate rock and, if necessary, the defoamer to a preslurry or mixing vessel 2 as in FIG. 1, the reactants are added directly to a dissolving slurry 22 in the first reaction vessel 16. The phosphoric acid and the phosphate rock are added in amounts such that the direct combination of the two results in a slurry containing between about 30% to about 40% solids by weight and an initial concentration of about 20% $P_2O_5$ in the liquid portion of the slurry. Once the reactants are dispersed in the dissolving slurry 22, the parameters such as temperature, pressure, concentration, and others are the same as described above.

FIG. 3 shows the flow or circulation patterns of the slurry in a system embodying features of the claimed invention. A slurry 60 flows from a premix vessel 61 through a conduit 62 into a first vessel 63. The first vessel 63 is fitted with a draft tube 64 and an agitator 65. Dissolving slurry 65a flows within the first vessel 63 as shown by dashed lines 66. Conduits 67, 68, and 69 are used to circulate slurries 65a and 72a between the first vessel 63 and a second reaction vessel 70, respectively. Slurry 65a flows through conduits 67 and 68 into the second vessel 70, which has a draft tube 71, an agitator 72, and a sulfuric acid inlet 74 for sulfuric acid introduction into the slurry 72a. Crystallization slurry 72a flows within the second vessel 70 as shown by dashed lines 73. The direction of flow shown by dashed lines 66 and 73 can be reversed without affecting the efficiency and effectiveness of the process.

A flow or circulation pattern is established between the first vessel 63 and the second vessel 70. Of equal importance are the flow patterns established within each vessel. The flow patterns of slurry within the vessels superimposed upon the flow patterns of slurry between vessels results not only in excellent dispersion of reactants within the slurry, but also the maintenance of very low temperature differentials in the slurry within a given vessel.

FIG. 4 shows another version of the present invention wherein the dissolving zone comprises two vessels. In this version, wet screened phosphate rock 60 is transferred to a rock reslurry tank 62 where it is mixed with recycled phosphoric acid 64 which contains free sulfuric acid. In this tank 62, calcium carbonate in phosphate rock reacts with free sulfuric acid in the recycle phosphoric acid forming calcium sulfate and carbon dioxide, and raising the slurry temperature to approximately 70° C. Practically all of the carbon dioxide formed is removed in this tank via vent 66. Defoamer 68 is added to the tank 62 as needed to control foaming. The rock reslurry tank can have a capacity, for example, of 17,200 gallons, and is equipped with an agitator 69.

Slurry 70 from the reslurry tank overflows into the first dissolver 72 of two dissolvers 72 and 82 which operate in series. A temperature of about 85° C. is maintained in the dissolvers. The top of the liquid level in the first dissolver 72 is higher than the top of the liquid level in the second dissolver 82. Defoamer 74 can be added to the first dissolver 82, by introducing it into the first dissolver with the slurry 74 from the reslurry tank. Slurry from the first dissolver overflows via downwardly sloping line 76 and is pumped by pump 78 via line 80 to the second dissolver 82. Slurry can also be recycled from the second vessel to the first via line 79, although this is not essential to plant operation. In operation, the flow through line 79 is usually equal to the flow through line 80. Defoamer 83 can also be added into the second dissolver as required. Both dissolvers are equipped with agitators 84 and draft tubes 86. Both dissolvers can have an operating volume of 187,500 gallons. At this volume, preferably the agitator pumping capacity is sufficient to provide no less than one operating volume turnover per three-quarter minute, i.e., about 250,000 gallons per minute.

Slurry 90 is transferred from the second dissolver 82 by a pump 92 via a conduit 94 into a crystallizer vessel 96, which contains an agitator 98 and a draft tube 100. The crystallizer 96 can have a volume of about 150,000 gallons, and the agitator pumping capacity should be sufficient to provide no less than one operating turnover per minute to insure proper mixing of the reagents in the crystallizer, i.e., about 150,000 gallons per minute. Sulfuric acid 102 and modifier 104 are added to the crystallizer 96.

Slurry 106 passes from the crystallizer 96 downwardly through a rock box 108 to separate out any large particulate matter and then into a pump 110 which pumps the slurry into a reservoir 112. Slurry passes from the reservoir 112 to a filter feed tank at a rate of about 1,770 gallons per minute for separation of phosphoric acid from calcium sulfate. Therefore, the ratio of the internal circulation rate of each dissolver to the rate of slurry feed to a separation operation is about 140 (250,000/1,770) and the ratio of the internal circulation rate of the crystallizer to the rate of slurry feed to a separation operation is about 85 (150,000/1,770).

The crystallizer is maintained under vacuum by a vacuum pump 114. Vapor 116 is withdrawn from the crystallizer 96 and passes to a barometric condenser 118 into which cooling water 120 is sprayed to spray cool the vapors. Condensate passes from the condensor 118 to a trench and the vapor 122 passes to a packed scrubber tower 123 to scrub impurities from the vapor 122. The liquid from the scrubbing tower passes to a trench and the vapor flows through a disengager 124 and into vacuum pump 114. The effluent 126 from the vacuum pump is pumped into a separator 128, from which inert gases 130 are passed to the atmosphere and water 132 is passed to a drain.

EXAMPLE 1

Vessels 16 and 28 and accompanying connective means such as conduits, pumps, etc. of FIG. 1 are filled with a slurry comprising calcium sulfate dihydrate, monocalcium phosphate, phosphoric acid and sulfuric acid. A typical size distribution of the phosphate rock is shown in Table 2, and the chemical analysis is shown in Table 4. The weight percent solids is about 35%, the density of the slurry is about 1.55 g/cc and the density of the liquid portion of the slurry is about 1.35 g/cc. The $P_2O_5$ concentration of the liquid portion of the slurry is about 28% by weight. The temperature in the first reaction vessel 16 is 82°±3° C., and the temperature in the second reaction vessel 28 is 83°±3° C. Soluble sulfate concentration, as previously defined, in the first vessel 16 is about 0.9%±0.5% and in the second vessel 28 is about 1.7%±0.7%.

A mixture of phosphate rock and phosphoric acid is prepared by adding phosphate rock to phosphoric acid in the ratio of 1638 pounds of rock (about 31% $P_2O_5$) to about 3279 pounds of phosphoric acid (about 20% $P_2O_5$). The temperature of the mixture is about 69° C. A defoaming agent is added as needed to reduce the foam caused by partial dissolution of the phosphate rock in phosphoric acid.

This phosphate rock—phosphoric acid mixture is added to the dissolving slurry in the first vessel 16 at the rate of about 400 gallons per minute (4917 pounds per minute). The incoming mixture is intimately mixed with the dissolving slurry. Intra-vessel mixing is accomplished by means of the draft tube and the agitator. A portion of the dissolving slurry is pumped from the first vessel 16 to the second vessel 28 at the rate of about 3,500 gallons per minute. The pumped dissolving slurry is intimately mixed with the crystallization slurry and 93% sulfuric acid which is added to the second vessel at about 90 gallons per minute. As in the first vessel 16, intra-vessel circulation is responsible for rapid dispersion of the dissolving slurry and the sulfuric acid into the crystallization slurry in the second vessel 28. The crystallization slurry flows at the rate of about 3,065 gallons per minute into the first vessel 16 in which it is thoroughly mixed with the dissolving slurry.

About 45 gallons per minute of water and volatile materials (HF, $SiF_4$, $J_2S$, etc.) are vaporized from the crystallization slurry in the second vessel 28. The second vessel 28 is maintained under a reduced pressure of about 10 inches of mercury absolute to control the temperature. Approximately 480 gallons per minute of slurry is withdrawn from the second vessel and flows through a reservoir 44 to a third vessel 48, a separator feed tank. Thus about 525 gallons per minute of material (vaporized material and the slurry to the separator feed tank) are removed from the system. Slurry is then passed from the feed tank to the separation section where the solid and liquid portions of the slurry are separated.

At these rates, the plant produces about 350 tons per day of $P_2O_5$ of 25-30% $P_2O_5$ phosphoric acid. The recovery data are summarized below.

Phosphate rock is present in the dissolving and in the crystallization slurries in the first and second reaction vessels, respectively. The amount present is quite small and varies considerably. The value for the "Citrate Insoluble" loss of the filter cake is a rough measure of undissolved and unreacted phosphate rock.

| Total Loss In Filter Cake | |
| --- | --- |
| | % $P_2O_5$ fed in Rock |
| Citrate insoluble | 0.18 |
| Citrate soluble | 3.36 |

-continued

| Total Loss In Filter Cake | |
| --- | --- |
| | % $P_2O_5$ fed in Rock |
| Water soluble | 1.80 |
| Total Loss | 5.34 |
| Total Recovery | 94.66% |

A typical analysis of the phosphoric acid produced by this process is shown in Table 3. The total residence time, from entering vessel 16 to exiting vessel 48, is calculated at 6.3 hours. The volume of vessel 16 is about 120,000 gallons. The volume of vessel 28 is about 40,000 gallons to normal liquid level.

Since the rate of circulation within the first vessel 16 and the rate of circulation within the second vessel 28 are each at least 50% of the volume of the slurry in the vessel, it can be calculated that the rate of circulation of the internal recycle within the first vessel (e.g., 50% of 120,000 gallons) can be at least 125 times (i.e., 50/100×120,000/480) the rate of slurry passed to the separation section (480 gallons per minute) and that the rate of circulation within the second vessel (50% of 40,000 gallons) can be at least about 41 times the rate of slurry passed to the separation section (i.e., 50/100×40,000/480). These high rates of circulation contribute to the dependability, efficiency, and effectiveness of the process. Preferably the rate of internal circulation in both vessels is at least 125 times the rate of slurry passed to the separation section.

EXAMPLE 2

Vessels 72, 82 and 96 and accompanying connective means such as conduits, pumps, etc. of FIG. 4 are filled with a slurry (from vessel 62) comprising calcium sulfate dihydrate, monocalcium phosphate, phosphoric acid and sulfuric acid. A typical size distribution of the phosphate rock is shown in Table 2, and the typical chemical analysis is shown in Table 1. The weight percent solids is about 40%, the density of the slurry is about 1.58 g/cc and the density of the liquid portion of the slurry is about 1.31 g/cc. The $P_2O_5$ concentration of the liquid portion of the slurry is about 26% by weight. The temperature in the first dissolving reaction vessel 72 is 82°±3° C., and the temperature in the second dissolving vessel 82 is 82°±3° C. and the temperature in the crystallizer vessel 96 is 83°±3° C. Soluble sulfate concentration, as previously defined, in the dissolver vessel 72 and 82 is about 0.9%±0.5% and in the crystallizer vessel 96 is about 1.7%±0.7%.

A mixture of phosphate rock and phosphoric acid is prepared by adding phosphate rock to phosphoric acid in the ratio of 192 tons of dry rock (about 31% $P_2O_5$ and 2% water) to about 360 tons of phosphoric acid (about 14% $P_2O_5$). The temperature of the mixture is about 82° C. A defoaming agent is added as needed to reduce the foam caused by partial dissolution of the phosphate rock in phosphoric acid.

This phosphate rock—phosphoric acid mixture is added to the dissolving slurry in the first vessel 72 at the rate of about 1,650 gallons per minute (569 tons per hour). The incoming mixture is intimately mixed with the dissolving slurry. Intra-vessel mixing is accomplished by means of the draft tube and the agitator. A portion of the dissolving slurry is pumped from the first vessel 72 to the second vessel 82 through line 80 and recycled through line 79 at the rate of about 9,000 gallons per minute. The dissolving slurry from vessel 82 is ultimately pumped to crystallizer 96 at a rate of 30,000 gallons per minute (line 94) and mixed with the crystallization slurry and 98% sulfuric acid which is added to the crystallalizer vessel through line 102 at about 348 gallons per minute. As in the dissolver vessels 72 and 82, intra-vessel circulation is responsible for rapid dispersion of the dissolving slurry and the sulfuric acid into the crystallization slurry in the second vessel 96. The crystallization slurry flows at the rate of about 28,500 gallons per minute into the first dissolver vessel 72 via line 73, in which it is thoroughly mixed with the dissolving slurry.

About 119,000 actual cubic feet per minute at 180° F. of water and volatile materials (HF, $SiF_4$, $H_2S$, etc.) are vaporized from the crystallization slurry in the crystallizer vessel 96. The crystallizer vessel is maintained under a reduced pressure of about 10 inches of mercury absolute to control the temperature. Approximately 1,720 gallons per minute of slurry is withdrawn from the crystallizer vessel and flows through a reservoir to a a separator feed tank. Slurry is then passed from the feed tank to the separation section (filter) where the solid and liquid portions of the slurry are separated part of the liquid being recycled to vessel 62.

At these rates, the plant produces about 1,320 tons per day of $P_2O_5$ of 26% $P_2O_5$ phosphoric acid.

The volume of each dissolver vessel is about 187,500 gallons, and the volume of the crystallizer vessel is about 150,565 gallons to normal operating liquid level.

Although this invention has been described in terms of certain preferred versions thereof, other versions are possible. Therefore, the scope of the following claims should not be limited to the description of the preferred versions contained herein.

TABLE 1

| PHOSPHATE ROCK ANALYSIS, % | | |
|---|---|---|
| Analysis | Typical | Range |
| BPL* | 67.91 | 66.0–69.0 |
| Insol. | 7.1 | 5.0–9.0 |
| $Fe_2O_3$ | 1.04 | 0.9–1.1 |
| $Al_2O_3$ | 1.08 | 0.9–1.5 |
| MgO | 0.37 | 0.2–0.9 |
| CaO | 45.36 | 43.5–46.8 |
| $Na_2O$ | 0.54 | 0.5–0.60 |
| $K_2O$ | 0.10 | 0.1–0.2 |
| F | 3.39 | 3.0–4.0 |
| Organics | 0.25 | 0.2–0.3 |
| $CO_2$ | 3.69 | 3.4–4.5 |
| $SO_4$ | 1.11 | 1.0–1.3 |

Rock contains 12% moisture
*Bone phosphate lime

TABLE 2

| Typical Phosphate Rock Screen Analysis | |
|---|---|
| Mesh | Cummulative Percent |
| +14 | 0.4 |
| +24 | 2.6 |
| +28 | 9.3 |
| +35 | 26.6 |
| +48 | 64.1 |
| +65 | 86.4 |
| +100 | 97.7 |
| −100 | 2.3 |

TABLE 3

| Typical Phosphate Acid Analysis | |
|---|---|
| $P_2O_5$ | 28.1% |
| $SO_4=$ | 2.2% |
| CaO | 0.3% |
| $F^-$ | 2.4% |
| MgO | 0.4% |
| $Fe_2O_3$ | 0.7% |
| $Al_2O_3$ | 1.0% |

TABLE 4

| Example 1 Phosphate Rock Analysis | |
|---|---|
| Compound | % By Weight |
| $P_2O_5$ | 31.2 |
| CaO | 45.6 |
| $Fe_2O_3$ | 1.4 |
| $Al_2O_3$ | 1.2 |
| MgO | 0.4 |
| $SiO_2$ | 8.7 |
| F | 3.7 |
| $SO_3$ | 0.9 |
| $CO_2$ | 3.6 |
| Organic | 1.8 |
| $H_2O$ | 1.1 |
| $N_2O$, $K_2O$ | 0.4 |

What is claimed is:

1. A process for the preparation of phosphoric acid from phosphate rock and sulfuric acid comprising the steps of:

(a) adding phosphoric acid, soluble sulfate and phosphate rock to a dissolving slurry contained in a dissolving zone, the dissolving slurry comprising calcium sulfate dihydrate, monocalcium phosphate, and phosphoric acid to substantially convert the added phosphate rock to monocalcium phosphate, phosphoric acid, and calcium sulfate dihydrate, the dissolving slurry being maintained at a soluble sulfate concentration of about −1.0 to about +1%, wherein the negative soluble sulfate concentration indicates an excess of calcium ions in the slurry and the extent to which there is an insufficient concentration of sulfate, expressed as a negative weight percent, to combine with such excess calcium ions to form calcium sulfate, and at a temperature and $P_2O_5$ concentration in the liquid such that calcium sulfate dihydrate is formed rather than calcium sulfate anhydrite or calcium sulfate hemihydrate;

(b) continuously removing a first portion of the dissolving slurry from the dissolving zone and continuously introducing said first portion of the dissolving slurry into a crystallization slurry contained in a crystallization zone, the crystallization slurry comprising calcium sulfate dihydrate, monocalcium phosphate, phosphoric acid and sulfuric acid, the crystallization slurry being maintained under a reduced pressure;

(c) adding sulfuric acid to the crystallization slurry to react with at least the monocalcium phosphate to form calcium sulfate dihydrate and phosphoric acid, while maintaining the crystallization slurry at a soluble sulfate concentration of from about +0.5% to about +3.0%, the soluble sulfate concentration of the crystallization slurry being greater than the soluble sulfate concentration of the dissolving slurry;

(d) continuously removing a first portion of the crystallization slurry from the crystallization zone and continuously introducing said first portion of the crystallization slurry directly into the dissolving slurry to provide at least a portion of the phosphoric acid and soluble sulfate added to the dissolving slurry in the dissolving zone;

(e) internally circulating a second portion of the dissolving slurry within the dissolving zone at a rate at least equal to 50% of the volume of the dissolving slurry per minute to better mix the dissolving slurry;

(f) internally circulating a second portion of the crystallization slurry within the crystallization zone at a rate at least equal to 50% of the volume of the crystallization slurry per minute to better mix the crystallization slurry; and (g) withdrawing a third portion of the crystallization slurry from the crystallization zone and separating the third portion into a liquid comprising phosphoric acid and a solid comprising calcium sulfate dihydrate.

2. The process according to claim 1 which includes the additional step of adding a defoamer to the dissolving slurry.

3. The process according to claim 1 in which the crystallization slurry is maintained under sufficient reduced pressure to control the temperature in the range of about 70° C. to about 90° C.

4. The process according to claim 1 in which the phosphate rock and phosphoric acid are continuously added to the dissolving slurry, the sulfuric acid is continuously added to the crystallization slurry and the third portion of the crystallization slurry is continuously separated into a liquid comprising phosphoric acid and a solid comprising calcium sulfate dihydrate.

5. The process according to claim 4 in which the temperature of the dissolving slurry is maintained between about 70° C. to about 90° C.; the temperature of the crystallization slurry is maintained between about 70° C. to about 90° C.; and the crystallization slurry is maintained under a reduced pressure of from about 3 inches of mercury absolute to about 20 inches of mercury absolute.

6. The process according to claim 1 in which material is volatilized under said reduced pressure and removed from said crystallization slurry and the third portion of the crystallization slurry is continuously withdrawn from the crystallization zone at a rate about equal to the rate at which phosphate rock, phosphoric acid and sulfuric acid are added to the dissolving and crystallization slurries minus the rate at which volatilized material is removed from the crystallization slurry.

7. The process according to claim 1 in which the phosphoric acid and the phosphate rock are added as a mixture to the dissolving slurry, wherein the phosphoric acid of the mixture comprises phosphoric acid separated from the third portion of the crystallization slurry and contains from about 0.5 to about 3.5% by weight sulfuric acid.

8. The process according to claim 1 in which phosphoric acid, in addition to the phosphoric acid in the first portion of the dissolving slurry, is added to the crystallization slurry.

9. The process according to claim 1 in which the soluble sulfate concentration of the dissolving slurry is maintained between about +0.5% to about +1.0%.

10. The process according to claim 1 in which the soluble sulfate concentration of the crystallization slurry is maintained between about +1.5% and about +2.5%.

11. The process according to claim 1 in which the temperature of the dissolving slurry is maintained between about 70° C. and about 90° C.; the temperature of the crystallization slurry is maintained between about 70° C. and about 90° C.; and the crystallization slurry is maintained under a reduced pressure of from about 3 inches of mercury absolute to about 20 inches of mercury absolute.

12. The process according to claim 1 wherein the second portion of the dissolving slurry is internally circulated at a rate of from about 50% to about 150% of the volume of the dissolving slurry per minute.

13. The process according to claim 12 wherein the second portion of the dissolving slurry is internally circulated at the rate of about 100% of the volume of the dissolving slurry per minute.

14. The process according to claim 1 wherein the second portion of the crystallization slurry is internally circulated at a rate of from about 50% to about 150% of the volume of the crystallization slurry per minute.

15. The process according to claim 14 wherein the second portion of the crystallization slurry is internally circulated at a rate of about 100% of the volume of the crystallization slurry per minute.

16. The process according to claim 1 wherein sulfuric acid, in addition to sulfuric acid in the first portion of the crystallization slurry, is added to the dissolving slurry.

17. The process according to claim 1 wherein the crystallization slurry is maintained at a density of about 1.46 to about 1.65 g/cc.

18. The process according to claim 1 wherein the liquid component of the crystallization slurry is maintained at a density of about 1.20 to about 1.38 g/cc.

19. The process according to claim 1 wherein the dissolving zone comprises only one vessel which contains the dissolving slurry, and the first portion of the dissolving slurry is continuously introduced directly into the crystallization slurry.

20. The process according to claim 1 wherein the dissolving zone comprises a first vessel and a second vessel serially connected, wherein the phosphoric acid, the phosphate rock, and the first portion of the crystallization slurry are introduced substantially only to the first vessel, slurry is passed from the first vessel to the second vessel, and dissolving slurry is introduced to the crystallization slurry substantially only from the second vessel.

21. The process according to claim 1 wherein the soluble sulfate concentration of the crystallization slurry is greater than the soluble sulfate concentration of the dissolving slurry by at least 0.5%.

22. A process for the preparation of phosphoric acid from phosphate rock and sulfuric acid comprising the steps of:

(a) adding phosphoric acid, soluble sulfate and phosphate rock to a dissolving slurry comprising calcium sulfate dihydrate, monocalcium phosphate, and phosphoric acid in a dissolving zone to substantially convert the added phosphate rock to monocalcium phosphate, phosphoric acid, and calcium sulfate dihydrate, the dissolving slurry being maintained at a soluble sulfate concentration of from about −1% to about +1%, wherein the negative soluble sulfate concentration indicates an excess of calcium ions in the slurry and the extent to which there is an insufficient concentration of sulfate, expressed as a negative weight percent, to combine with such excess calcium ions to form calcium sulfate, a temperature from about 70° C. to about 90° C. and at a P$_2$O$_5$ concentration in the liquid such that calcium sulfate dihydrate is formed rather than calcium sulfate anhydrite or calcium sulfate hemihydrate;

(b) continuously removing a first portion of the dissolving slurry from the dissolving zone and continuously passing said first portion of the dissolving slurry to a crystallization slurry comprising calcium sulfate dihydrate, monocalcium phosphate, phosphoric acid and sulfuric acid contained in a crystallization zone maintained under a reduced pressure sufficient to maintain the slurry in the crystallization zone at a temperature from about 70° C. to about 90° C.;

(c) adding sulfuric acid to the crystallization zone to react with at least the monocalcium phosphate to form calcium sulfate dihydrate and phosphoric acid, said crystallization slurry being maintained at a soluble sulfate concentration of from about +0.5% to about 3.0%, the soluble sulfate concentration of the crystallization slurry being at least 0.5% greater than the soluble sulfate concentration of the dissolving slurry;

(d) continuously removing a first portion of the crystallization slurry and continuously passing said first portion of the crystallization slurry directly into the dissolving slurry to provide at least a portion of the phosphoric acid and soluble sulfate added to the dissolving slurry in the dissolving zone;

(e) internally circulating a second portion of each slurry within the respective dissolving and crystallization zones at a rate at least equal to 50% of the volume, per minute, of the respective slurries contained in the dissolving and crystallization zones to better mix the slurries; and (f) withdrawing a third portion of the crystallization slurry from the crystallization zone and separating the withdrawn third portion into a liquid comprising phosphoric acid and a solid comprising calcium sulfate dihydrate.

23. The process as recited in claim 22 in which the reduced pressure in the crystallization zone is maintained from about 3 inches to about 20 inches of mercury absolute.

24. The process according to claim 22 in which the crystallization portion of the slurry is internally circulated at a rate at least about 40 times the rate at which the third portion of the crystallization slurry is withdrawn from the crystallization zone.

25. The process according to claim 22 in which the second portion of the dissolving slurry is internally circulated at a rate at least about 100 times the rate at which the third portion of the crystallization slurry is withdrawn from the crystallization zone.

26. The process according to claim 22 in which the phosphoric acid and the phosphate rock are added as a mixture to the first slurry.

27. The process according to claim 25 in which phosphoric acid, in addition to phosphoric acid in the first portion of the dissolving slurry, is added to the crystallization slurry in the crystallization zone.

28. The process according to claim 25 in which the soluble sulfate concentration of the dissolving slurry in the dissolving zone is maintained between about +0.5% to about +1.0%.

29. The process according to claim 25 in which the soluble sulfate concentration of the crystallization slurry in the crystallization zone is maintained between about +1.5% and about +2.5%.

30. The process according to claim 25 wherein the second portion of the dissolving slurry is internally circulated at a rate of from about 50% to about 150% of the volume of the dissolving slurry.

31. The process according to claim 25 wherein the second portion of the crystallization slurry is internally circulated at a rate of from about 50% to about 150% of the volume of the crystallization slurry.

32. The process according to claim 25 wherein sulfuric acid, in addition to sulfuric acid in the first portion of the crystallization slurry, is added to the dissolving zone.

33. A process for the preparation of phosphoric acid from phosphate rock and sulfuric acid comprising the steps of:

(a) adding phosphoric acid, soluble sulfate and phosphate rock to a dissolving slurry contained in a dissolving zone, the dissolving slurry comprising solid calcium sulfate, monocalcium phosphate, and phosphoric acid, to substantially convert the added phosphate rock into monocalcium phosphate, phosphoric acid and solid calcium sulfate;

(b) continuously removing a first portion of the dissolving slurry from the dissolving zone and continuously introducing said first portion of the dissolving slurry into a crystallization slurry contained in a crystallization zone, the crystallization slurry comprising calcium sulfate, monocalcium phosphate, phosphoric acid and sulfuric acid, the crystallization slurry being maintained at a temperature up to about 130° C.

(c) adding sulfuric acid to the crystallization slurry to react with at least the monocalcium phosphate to form solid calcium sulfate and phosphoric acid, the crystallization slurry being maintained at a soluble sulfate concentration greater than the soluble sulfate concentration of the dissolving slurry;

(d) continuously removing a first portion of the crystallization slurry from the crystallization zone and continuously introducing said first portion of the crystallization slurry directly into the dissolving slurry to provide at least a portion of the phosphoric acid and soluble sulfate added to the dissolving slurry in the dissolving zone;

(e) internally circulating a second portion of the dissolving slurry within the dissolving zone at a rate at least equal to 50% of the volume of the dissolving slurry per minute to better mix the dissolving slurry;

(f) internally circulating a second portion of the crystallization slurry within the crystallization zone at a rate at least equal to 50% of the volume of the crystallization slurry per minute to better mix the crystallization slurry; and (g) withdrawing a third portion of the crystallization slurry from the crystallization zone and separating the withdrawn third portion of the crystallization slurry into a liquid comprising phosphoric acid and a solid comprising calcium sulfate.

34. The process according to claim 33 which includes the additional step of adding a defoamer to the dissolving slurry.

35. The process according to claim 34 in which the crystallization slurry is maintained under a reduced pressure of from about 3 inches to about 20 inches of mercury absolute.

36. The process according to claim 33 in which the phosphate rock and phosphoric acid are continuously added to the dissolving slurry, the sulfuric acid is continuously added to the crystallization slurry and the third portion of the crystallization slurry is continuously separated into a liquid comprising phosphoric acid and a solid comprising calcium sulfate.

37. The process according to claim 33 in which material is volatilized under said reduced pressure and removed from said crystallization slurry and a third portion of the crystallization slurry is continuously withdrawn from the crystallization zone at a rate about equal to the rate at which phosphate rock, phosphoric acid and sulfuric acid are added to the dissolving and crystallization slurries minus the rate at which volatilized material is removed from the crystallization slurry.

38. The process according to claim 24 in which the second portion of the dissolving slurry is internally circulated at a rate at least about 100 times the rate at which the third portion of the crystallization slurry is withdrawn from the crystallization zone.

39. The process according to claim 33 in which the phosphoric acid and the phosphate rock are added as a mixture to the dissolving slurry, and wherein the phosphoric acid of the mixture comprises phosphoric acid separated from the third portion of the crystallization slurry and contains from about 0.5 to about 3.5% by weight sulfuric acid.

40. The process according to claim 33 in which phosphoric acid, in addition to phosphoric acid in the first portion of the dissolving slurry, is added to the crystallization slurry.

41. The process according to claim 33 in which the temperature of the dissolving slurry is maintained between about 70° C. to about 90° C.; the temperature of the crystallization slurry is maintained between about 70° C. to about 90° C.; and the crystallization slurry is maintained under a reduced pressure of from about 2 inches of mercury absolute to about 29 inches of mercury absolute.

42. The process according to claim 33 wherein the second portion of the dissolving slurry is internally circulated at a rate of from about 50% to about 150% of the volume of the dissolving slurry per minute.

43. The process according to claim 41 wherein the second portion of the dissolving slurry is internally circulated at a rate of about 100% of the volume of the dissolving slurry per minute.

44. The process according to claim 33 wherein the second portion of the crystallization slurry is internally circulated at a rate of from about 50% to about 150% of the volume of the crystallization slurry per minute.

45. The process according to claim 33 wherein the second portion of the crystallization slurry is internally circulated at a rate of about 100% of the volume of the crystallization slurry per minute.

46. The process according to claim 23 wherein sulfuric acid, in addition to sulfuric acid in the first portion of the crystallization slurry, is added to the dissolving slurry.

47. The process according to claim 33 wherein the crystallization slurry is maintained at a density of about 1.46 to about 1.65 g/cc.

48. The process according to claim 33 wherein the liquid component of the crystallization slurry is maintained at a density of about 1.20 to about 1.38 g/cc.

49. The process according to claim 33 wherein the dissolving zone comprises only one vessel within said vessel contains the dissolving slurry, and the first portion of the dissolving slurry is continuously introduced directly into the crystallization slurry.

50. The process according to claim 33 wherein the dissolving zone comprises a first vessel and a second vessel serially connected, wherein the phosphoric acid and the phosphate rock and the first portion of the crystallization slurry are introduced substantially only to the first vessel, slurry is passed from the first vessel to the second vessel, and dissolving slurry is introduced to the crystallization slurry substantially only from the second vessel.

51. A process for the preparation of phosphoric acid from phosphate rock and sulfuric acid comprising the steps of:
  (a) adding phosphoric acid, soluble sulfate and phosphate rock to a dissolving slurry contained in a dissolving zone, the dissolving slurry comprising calcium sulfate dihydrate, monocalcium phosphate, and phosphoric acid to substantially convert the added phosphate rock to monocalcium phosphate, phosphoric acid, and calcium sulfate dihydrate, the dissolving slurry being maintained at a soluble sulfate concentration of about $-1.0$ to about $+1\%$, wherein the negative soluble sulfate concentration indicates an excess of calcium ions in the slurry and the extent to which there is an insufficient concentration of sulfate, expressed as a negative weight percent, to combine with such excess calcium ions to form calcium sulfate, and at a temperature and $P_2O_5$ concentration in the liquid such that calcium sulfate dihydrate is formed rather than calcium sulfate anhydrite or calcium sulfate hemihydrate;
  (b) continuously removing a first portion of the dissolving slurry from the dissolving zone and continuously introducing said first portion of the dissolving slurry into a crystallization slurry contained in a crystallization zone, the crystallization slurry comprising calcium sulfate dihydrate, monocalcium phosphate, phosphoric acid and sulfuric acid, the crystallization slurry being maintained under a reduced pressure;
  (c) adding sulfuric acid to the crystallization slurry to react with at least the monocalcium phosphate to form calcium sulfate dihydrate and phosphoric acid, while maintaining the crystallization slurry at a soluble sulfate concentration of from about $+0.5\%$ to about $+3.0\%$; the soluble sulfate concentration of the crystallization slurry being greater than the soluble sulfate concentration of the dissolving slurry;
  (d) continuously removing a first portion of the crystallization slurry from the crystallization zone and continuously introducing said first portion of the crystallization slurry directly into the dissolving slurry to provide at least a portion of the phosphoric acid and soluble sulfate added to the dissolving slurry in the dissolving zone;
  (e) internally circulating a second portion of the dissolving slurry within the dissolving zone at a rate at least equal to 50% of the volume of the dissolving slurry per minute to better mix the dissolving slurry;
  (f) internally circulating a second portion of the crystallization slurry within the crystallization zone at a rate at least equal to 50% of the volume of the crystallization slurry per minute to better mix the crystallization slurry; and (g) withdrawing a third portion of the crystallization slurry from the crystallization zone and separating the third portion into a liquid comprising phosphoric acid and a solid comprising calcium sulfate dihydrate, the rate of internal circulation of the second portion of the crystallization slurry being at least 40 times the rate at which the third portion of the crystallization slurry is withdrawn from the crystallization zone.

52. A process as claimed in claim 51 in which the rate of internal circulation of the second portion of the crystallization slurry is at least 100 times the rate at which the third portion of the crystallization slurry is withdrawn from the crystallization zone.

53. A process for the preparation of phosphoric acid from phosphate rock and sulfuric acid comprising the steps of:

(a) adding phosphoric acid, soluble sulfate and phosphate rock to a dissolving slurry contained in a dissolving zone, the dissolving slurry comprising solid calcium sulfate, monocalcium phospate, and phosphoric acid, to substantially convert the added phosphate rock into monocalcium phosphate, phosphoric acid and solid calcium sulfate;

(b) continuously removing a first portion of the dissolving slurry from the dissolving zone and continuously introducing said first portion of the dissolving slurry into a crystallization slurry contained in a crystallization zone, the crystallization slurry comprising calcium sulfate, monocalcium phosphate, phosphoric acid and sulfuric acid, the crystallization slurry being maintained at a temperature up to about 130° C.;

(c) adding sulfuric acid to the crystallization slurry to react with at least the monocalcium phosphate to form solid calcium sulfate and phosphoric acid, the crystallization slurry being maintained at a soluble sulfate concentration greater than the soluble surface concentration of the dissolving slurry;

(d) continuously removing a first portion of the crystallization slurry from the crystallization zone and continuously introducing said first portion of the crystallization slurry directly into the dissolving slurry to provide at least a portion of the phosphoric acid and soluble sulfate added to the dissolving slurry in the dissolving zone;

(e) internally circulating a second portion of the dissolving slurry within the dissolving zone at a rate at least equal to 50% of the volume of the dissolving slurry per minute to better mix the dissolving slurry;

(f) internally circulating a second portion of the crystallization slurry within the crystallization zone at a rate at least equal to 50% of the volume of the crystallization slurry per minute to better mix the crystallization slurry; and (g) withdrawing a third portion of the crystallization slurry from the crystallization zone and separating the withdrawn third portion of the crystallization slurry into a liquid comprising phosphoric acid and a solid comprising calcium sulfate, the rate of internal circulation of the second portion of the crystallization slurry being at least 40 times the rate at which the crystallization slurry is withdrawn from the crystallization zone.

54. A process as claimed in claim 53 in which the rate of internal circulation of the second portion of the crystallization slurry is at least 100 times the rate at which the third portion of the crystallization slurry is withdrawn from the crystallization zone.

* * * * *